United States Patent
Schulz

(10) Patent No.: US 11,591,462 B2
(45) Date of Patent: Feb. 28, 2023

(54) STYRENIC COPOLYMER BLEND WITH LOW SHRINKAGE

(71) Applicant: INEOS STYROLUTION GROUP GMBH, Frankfurt am Main (DE)

(72) Inventor: Tobias Schulz, Cologne (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 622 days.

(21) Appl. No.: 16/495,133

(22) PCT Filed: Mar. 14, 2018

(86) PCT No.: PCT/EP2018/056318
§ 371 (c)(1),
(2) Date: Sep. 18, 2019

(87) PCT Pub. No.: WO2018/172148
PCT Pub. Date: Sep. 27, 2018

(65) Prior Publication Data
US 2020/0024437 A1    Jan. 23, 2020

(30) Foreign Application Priority Data

Mar. 22, 2017  (EP) .................................... 17162300

(51) Int. Cl.
| | | |
|---|---|---|
| *C08L 25/14* | (2006.01) | |
| *B29C 45/00* | (2006.01) | |
| *C08L 25/12* | (2006.01) | |
| *B29K 25/00* | (2006.01) | |
| *B29L 31/30* | (2006.01) | |

(52) U.S. Cl.
CPC .......... *C08L 25/14* (2013.01); *B29C 45/0001* (2013.01); *B29C 45/0025* (2013.01); *C08L 25/12* (2013.01); *B29K 2025/08* (2013.01); *B29L 2031/30* (2013.01)

(58) Field of Classification Search
CPC ...... C08L 25/14; C08L 25/12; B29C 45/0001; B29C 45/0025; B29K 2025/08; B29L 2031/30
USPC .......................................................... 525/93
See application file for complete search history.

(56) References Cited

U.S. PATENT DOCUMENTS

| | | | |
|---|---|---|---|
| 5,318,813 A | 6/1994 | Flexman, Jr. | |
| 6,323,279 B1 | 11/2001 | Guntherberg et al. | |
| 7,863,378 B2 * | 1/2011 | Nishihara | C08L 53/02 525/88 |
| 2006/0178543 A1 | 8/2006 | Krupinski et al. | |
| 2008/0058471 A1 * | 3/2008 | Nishihara | C08L 53/025 525/88 |
| 2015/0099840 A1 * | 4/2015 | Glogovsky | C08L 23/16 524/400 |
| 2016/0319120 A1 * | 11/2016 | Niessner | B29C 64/106 |

FOREIGN PATENT DOCUMENTS

| | | |
|---|---|---|
| CN | 101115615 A | 1/2008 |
| CN | 104497463 A | 4/2015 |
| EP | 0541174 A1 | 5/1993 |
| EP | 0789058 A1 | 8/1997 |
| EP | 2537895 A1 | 12/2012 |
| EP | 2754691 A1 | 7/2014 |

* cited by examiner

*Primary Examiner* — Michael M. Bernshteyn
(74) *Attorney, Agent, or Firm* — Raphael Bellum PLLC

(57) ABSTRACT

The invention relates to polymer blends of a styrene copolymer A selected from the group consisting of styrene acrylonitrile copolymers (SAN), styrene acrylonitrile maleic anhydride terpolymers (SMA), styrene acrylic copolymers, acrylonitrile butadiene styrene terpolymers (ABS), acrylonitrile butadiene styrene terpolymers with polyamide (ABS/PA), and acrylonitrile styrene acrylate terpolymers (ASA); and at least one copolymer B selected from the group consisting of styrene-butadiene block copolymers (SBC) and styrene-isoprene block copolymers (SIS); wherein the mold shrinkage of the polymer blend is reduced by at least 5% compared to the mold shrinkage of the pure styrene copolymer A.A process for the preparation of the polymer blends and the uses of the polymer blends in an injection molding process are described.

14 Claims, No Drawings

STYRENIC COPOLYMER BLEND WITH LOW SHRINKAGE

The invention relates to a polymer blend comprising at least two different copolymer components, wherein the copolymer blend has reduced mold shrinkage compared to the mold shrinkage of the single (main) component. The invention further relates to a process for the preparation of said polymer blend, the use of said blend in an injection molding process, and an article prepared by injection molding of said copolymer blend.

Styrene copolymers are widely used in injection molding processes. There is a constant need for improved ways to process thermoplastic compositions, e.g. by improved melt flow of the styrene copolymers, and for improved mold shrinkage of the styrene-copolymers. Styrene copolymers already have a relatively low price and low mold shrinkage compared to semi-crystalline polymers like polyamide or polypropylene, which often is not sufficient for some applications, especially for the production of articles with complicated geometries (e.g. automotive parts).

Injection molding is used to produce many products, such as household articles, automotive part, packaging articles, mechanical parts, such as gears, and other plastic products available today. Injection molding is a common method of manufacturing thermoplastic parts. It is useful for producing high volumes of the same object. For an injection molding process, low mold shrinkage is essential in order to create complicated geometries.

EP-A 2754691 discloses a polypropylene resin reinforced with a filler material with excellent moldability, which can be used for the production of automobile parts.

EP-A 541174 describes a block copolymer composition comprising a block copolymer with at least one block from a vinyl aromatic compound and at least one block derived from conjugated dienes, a thermoplastic polymer, plastifier, filler and optionally additional additives.

There is however a continuous need for polymer blends with low mold shrinkage. It was one objective of the present invention to provide polymer blends which comply with the above identified technical needs. This was achieved by the present invention as described herein below and as reflected in the claims.

The term "copolymer" as used herein describes a polymer which is formed by polymerizing two or more different monomers.

The (co)polymer may be composed of only one linear chain or may be branched. The monomer units in the copolymer may be alternating regularly forming an alternating copolymer, may repeat periodically forming a periodic copolymer, may be statistically distributed forming a statistical copolymer, or may form different blocks, forming a block copolymer.

The present invention is described in the following by disclosing various aspects of the invention. Combinations of different aspects pertaining to different features are considered to be disclosed.

The invention relates to a polymer blend with at least two different copolymer components comprising:

a) 85.0 to 99.9 wt.-%, in particular 89.0 to 99.5 wt-% of at least one styrene copolymer A selected from the group consisting of styrene acrylonitrile copolymers (SAN), styrene acrylonitrile maleic anhydride terpolymers (SMA), styrene acrylic copolymers, acrylonitrile butadiene styrene terpolymers (ABS), acrylonitrile butadiene styrene terpolymers with polyamide (ABS/PA), and acrylonitrile styrene acrylate terpolymers (ASA);

(b) 0.1 to 10.0 wt.-%, in particular 0.5 to 4.5 wt-% of at least one copolymer B selected from the group consisting of styrene-butadiene block copolymers (SBC) and styrene-isoprene block copolymers (SIS);

(c) 0 to 5.0 wt.-%, in particular 0.1 to 5.0 wt.-% of at least one additive C.

The wt.-% are referring to the complete polymer blend, and the mold shrinkage of the polymer blend is reduced by at least 5% compared to the mold shrinkage of the pure styrene copolymer A.

In one aspect of the invention, the polymer blend comprises 89.0 to 99.5 wt.-% of at least one styrene copolymer A, and 0.5 to 4.5 wt.-% of at least one copolymer B. In another aspect of the invention the polymer blend comprises 89.0 to 99.0 wt.-% of at least one styrene copolymer A, and 1.0 to 4.5 wt.-% of at least one copolymer B.

In a further aspect of the present invention, the polymer blend comprises 90.0 to 98.4 wt.-% of at least one styrene copolymer A, 2.0 to 5.0 wt.-% of at least one copolymer B, and 0.1 to 5.0 wt.-% of at least one additive C.

Styrene Copolymer Component A

At least one styrene copolymer A is selected from the group consisting of styrene acrylonitrile copolymers (SAN), styrene acrylonitrile maleic anhydride terpolymers (SMA), styrene acrylic copolymers, acrylonitrile butadiene styrene terpolymers (ABS), acrylonitrile butadiene styrene terpolymers with polyamide (ABS/PA), and acrylonitrile styrene acrylate terpolymers (ASA). In one aspect of the invention, at least one styrene copolymer A is selected from the group consisting of styrene acrylonitrile copolymer (SAN) and styrene acrylonitrile maleic anhydride terpolymers (SMA). In another aspect of the invention styrene copolymer A is a styrene acrylonitrile copolymer (SAN). In a further aspect of the invention, the styrene copolymer A is a styrene acrylonitrile maleic anhydride terpolymer (SMA).

Suitable styrene copolymers A may be produced by the methods of anionic or radical polymerization which are known in the art.

The weight average molar weight Mw of the styrene copolymer A often is in the range of from 140,000 to 360,000 g/mol, determined by GPC (gel permeation chromatography; solvent tetrahydrofuran, polystyrene as polymer standard) with UV detection.

Styrene acrylonitrile copolymers (SAN) are copolymers consisting of styrene and acrylonitrile. In one aspect of the present invention, the relative composition is between 70 and 80 wt.-% styrene and 20 to 30 wt.-% acrylonitrile.

In one embodiment of the present invention, SAN copolymers comprise 18 to 35 wt.-%, acrylonitrile (AN), and 82 to 65 wt.-% styrene (S), wherein the sum of the amounts of styrene and acrylonitrile totals 100 wt.-%. In another embodiment SAN copolymers comprise 20 to 32 wt.-% acrylonitrile, and 80 to 68 wt.-% styrene. In another embodiment SAN copolymers comprise 22 to 30 wt.-% acrylonitrile, and 78 to 70 wt.-% styrene.

SAN copolymers (I'-2) are also known and commercially available as for example Luran® 358 N (VLM); Luran 251000, Luran 2580 from Ineos Styrolution (Frankfurt).

Styrene acrylonitrile maleic anhydride terpolymers (SMA) are terpolymers of styrene, acrylonitrile, and maleic anhydride. In one aspect of the invention, a SMA terpolymer with the relative composition of 20 to 30 wt.-% acrylonitrile, 0.5 wt.-% to 3 wt.-% maleic anhydride and 67 to 79.5 wt.-% styrene was used.

In another aspect of the invention, a SMA terpolmyer with 24 wt.-% acrylonitrile, 1 wt.-% maleic anhydride and 75 wt.-% styrene was used. In a further aspect of the invention, a SMA terpolmyer with 24 wt.-% acrylonitrile, 2.1 wt.-% maleic anhydride and 73.9 wt.-% styrene was used.

Styrene acrylic copolymers are copolymers from styrene and acrylic monomers. In one aspect of the invention, the styrene acrylic copolymer is a copolymer from styrene and methyl methacrylate. Suitable styrene acrylic copolymers are for example NAS® polymers from Ineos Styrolution (Frankfurt).

Acrylonitrile butadiene styrene terpolymer (ABS) is a terpolymer made by polymerizing styrene and acrylonitrile in the presence of at least one polybutadiene.

In one embodiment of the present invention, suitable ABS resins comprise at least one graft copolymer (I'-1) of a diene-based rubber and at least one rubber free vinyl copolymer (I'-2). In another embodiment suitable ABS resins comprise one graft copolymer (I'-1) of a diene-based rubber and one rubber free vinyl copolymer (I'-2).

The graft copolymer (I'-1) is based on a diene-rubber, in particular a butadiene rubber, upon which a mixture of at least one vinylaromatic monomer, in particular styrene, and acrylonitrile and optionally further monoethylenically unsaturated monomers is grafted.

In one embodiment the rubber free vinyl copolymer (I'-2) is in particular a copolymer made from at least one vinylaromatic monomer such as styrene and acrylonitrile and optionally an additional monoethylenically unsaturated monomer. In another embodiment the rubber free vinyl copolymer (I'-2) is in particular a copolymer made from one vinylaromatic monomer such as styrene and acrylonitrile and optionally an additional monoethylenically unsaturated monomer.

In a further embodiment of the present invention the rubber free copolymer (I'-2) is a copolymer made from styrene and acrylonitrile (SAN copolymer).

The graft copolymer (I'-1) is usually embedded in a matrix made from the rubber free vinyl copolymer (I'-2).

Such an ABS resin (I') is commercially available e.g. from Ineos Styrolution company (Frankfurt) as Terluran® GP22 (ABS) and Terluran HI-10 (ABS).

In one aspect of the invention, the relative composition is between 15 to 35 wt.-% acrylonitrile, 5 to 30 wt.-% butadiene and 40 to 60 wt.-% styrene.

In another embodiment an ABS (I') resin comprising components (I'-1) and (I'-2) are used:
(I'-1) from 5 to 80% by weight, based on (I'), of a graft polymer (I'-1) having monomodal or, in another embodiment, bimodal particle size distribution made from,
a1) 40 to 90% by weight of an elastomeric particulate graft base a1), obtained by polymerization of, based on a1),
  a11) from 70 to 100% by weight of at least one conjugated diene, in particular butadiene,
  a12) from 0 to 30% by weight of at least one other monoethylenically unsaturated monomer, and
  a13) from 0 to 10% by weight of at least one polyfunctional, crosslinking monomer, and
a2) from 10 to 60% by weight of a graft a2) made from, based on a2),
  a21) from 65 to 95% by weight of at least one vinylaromatic monomer, in particular styrene,
  a22) from 5 to 35% by weight of acrylonitrile,
  a23) from 0 to 30% by weight of at least one other monoethylenically unsaturated monomer, and
  a24) from 0 to 10% by weight of at least one polyfunctional, crosslinking monomer, and
(I'-2) from 20 to 95% by weight of a rubber free vinyl copolymer (I'-2) having a viscosity number VN (determined according to DIN 53726 at 25° C., 0.5% by weight in dimethylformamide) of from 50 to 120 ml/g, made from, based on (I'-2),
  a21) from 69 to 81% by weight of at least one vinylaromatic monomer, in particular styrene,
  a22) from 19 to 31% by weight of acrylonitrile, and
  a23) from 0 to 12% by weight of at least one other monoethylenically unsaturated monomer.

Such ABS resins are described e.g. in U.S. Pat. No. 6,323,279.

Also acrylonitrile butadiene styrene terpolymer can be used in a blend with polyamide (ABS/PA).

Polyamides which are suitable for the afore-mentioned blends of ABS resins are described in EP-A 2537895 in paragraphs 39 to 40 to which is in particular referred. Suitable polyamides are known homopolyamides, copolyamides and mixtures of such polyamides. They can be semi-crystalline and/or amorphous polyamides. Suitable semi-crystalline polyamides are polyamide-6, polyamide-6,6, mixtures and corresponding copolymers of those components. Also included are semi-crystalline polyamides, the acid component of which consists wholly or partially of terephthalic acid and/or isophthalic acid and/or suberic acid and/or sebacic acid and/or azelaic acid and/or adipic acid and/or cyclohexanedicarboxylic acid, the diamine component of which consists wholly or partially of m- and/or p-xylylene-diamine and/or hexamethylenediamine and/or 2,2,4-trimethylhexamethylenediamine and/or 2,2,4-trimethylhexa-methylenediamine and/or isophoronediamine, and the composition of which is in principle known. Mention may also be made of polyamides that are prepared wholly or partially from lactams having from 7 to 12 carbon atoms in the ring, optionally with the concomitant use of one or more of the above-mentioned starting components. In one embodiment of the invention semi-crystalline polyamides are polyamide-6 and polyamide-6,6 and mixtures thereof.

Known products may be used as amorphous polyamides. They are obtained by polycondensation of diamines, such as ethylenediamine, hexamethylenediamine, decamethylenediamine, 2,2,4- and/or 2,4,4-trimethylhexamethylenediamine, m- and/or p-xylylene-diamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethylcyclohexylamine, 2,5- and/or 2,6-bis-(aminomethyl)-norbornane and/or 1,4-diaminomethylcyclohexane, with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid.

Also suitable are copolymers obtained by polycondensation of a plurality of monomers, as well as copolymers prepared with the addition of aminocarboxylic acids such as ε-aminocaproic acid, ω-aminoundecanoic acid or ω-aminolauric acid or their lactams. Particularly suitable amorphous polyamides are the polyamides prepared from isophthalic acid, hexamethylenediamine and further diamines such as 4,4'-diaminodicyclohexylmethane, isophoronediamine, 2,2,4- and/or 2,4,4-trimethylhexamethylenediamine, 2,5- and/or 2,6-bis-(aminomethyl)-norbornene; or from isophthalic acid, 4,4'-diaminodicyclohexylmethane and ε-caprolactam; or from isophthalic acid, 3,3'-dimethyl-4,4'-diaminodicyclohexylmethane and laurinlactam; or from terephthalic acid and the isomeric mixture of 2,2,4- and/or 2,4,4-trimethylhexamethylenediamine.

In one embodiment of the invention the polyamides have a relative viscosity (measured in a 1 wt. % solution in m-cresol or 1% (weight/volume) solution in 96 wt. % sulfuric acid at 25° C.) of from 2.0 to 5.0, in another embodiment from 2.5 to 4.0.

In a further embodiment polyamides are e.g. Ultramid® grades such as Ultramid B24N 03 or Ultramid B27E commercially available from BASF SE, Germany.

In one embodiment of the invention the matrix polymer of the afore-mentioned comprises:

28 to 52 wt.-%, in another embodiment 35 to 45 wt.-%, in a further embodiment 36 to 41 wt.-% polyamide, and 48 to 72 wt.-%, in another embodiment 55 to 65 wt.-%, in a further embodiment 59 to 64 wt.-% ABS resin, wherein the sum of both components totals 100% by weight.

Such ABS resins with polyamide are commercially available as Terblend® N grades from Styrolution company (Frankfurt, Germany).

In a further embodiment of the invention the matrix polymer of the afore-mentioned blends of ABS resins with polyamide comprises of:

34 to 74 wt.-%, in another embodiment of 55 to 72 wt.-%, in a further embodiment of 58 to 70 wt.-% polyamide, and 26 to 66 wt.-%, in another embodiment of 28 to 45 wt.-%, in a further embodiment of 30 to 42 wt.-% ABS resin, wherein the sum of both components totals 100% by weight.

Acrylonitrile styrene acrylate terpolymer (ASA) is a terpolymer prepared from acrylonitrile, styrene, and acrylates. The spherical particles of crosslinked acrylate rubber are chemically grafted with styrene acrylonitrile copolymer chains, and are embedded in a styrene acrylonitrile matrix.

In one embodiment the ASA resins comprise 29 to 46 wt.-% acrylonitrile styrene graft copolymer and 54 to 71 wt.-% crosslinked acrylate rubber, wherein the sum of both components totals 100% by weight.

In one embodiment the ASA graft copolymer is built up from ($a_3$) 30 to 90% by weight, based on the total weight of the ASA graft copolymer, of a graft base ($a_3$) with a glass transition temperature ($T_g$) below –10° C. made from ($a_{31}$) an at least partially crosslinked acrylate polymer formed from ($a_{311}$) 50 to 99.9% by weight, based on ($a_{31}$), of at least one $C_1$-$C_{10}$-alkyl acrylate, in particular n-butylacrylate, ($a_{312}$) 0.1 to 5% by weight, based on ($a_{31}$), of at least one polyfunctional crosslinking monomer and ($a_{313}$) 0 to 49.9% by weight, based on ($a_{31}$), of a further monomer which is copolymerizable with ($a_{111}$) selected from the group consisting of the vinyl $C_1$-$C_8$-alkyl ethers, butadiene, isoprene, styrene, acrylonitrile and methacrylonitrile, and/or methyl methacrylate ($a_4$) from 10 to 70% by weight, based on (I'), of a graft ($a_4$) with a ($T_g$) above 50° C., grafted onto the graft base ($a_3$) and built up from ($a_{41}$) 50 to 95% by weight, based on ($a_4$), of at least one vinylaromatic monomer, in particular styrene, ($a_{42}$) 5 to 50% by weight, based on ($a_4$), of at least one polar, copolymerizable comonomer selected from the group consisting of acrylonitrile, methacrylonitrile, $C_1$-$C_4$-alkyl (meth)acrylates, maleic anhydride and maleimides, and (meth)acrylamide, and vinyl $C_1$-$C_8$-alkyl ethers, and mixtures of these, in particular acrylonitrile.

Preferably said graft copolymer is an ASA graft copolymer made from an at least partially crosslinked n-butyl acrylate rubber upon which styrene and acrylonitrile are grafted.

Copolymer Component B

Copolymer B is selected from the group consisting of styrene-butadiene block copolymers (SBC) and styrene-isoprene block copolymers (SIS). In one aspect of the present invention copolymer B is at least one styrene-butadiene block copolymer. In another aspect copolymer B is at least one styrene-isoprene block copolymer.

Styrene butadiene block copolymers (SBC) are copolymers from styrene and butadiene, wherein at least one block consisting of a styrene butadiene copolymer with a random distribution of styrene and butadiene $(S/B)_{random}$ and/or a styrene butadiene copolmyer with a styrene gradient $(S/B)_{gradient}$ is connected to at least one polystyrene block S. The block copolymer may be linear or star shaped. In one aspect of the invention, a styrene butadiene copolymer block forms the core of the styrene butadiene block copolymer, with polystyrene blocks forming the outside of the polymer.

The amount of butadiene in the styrene butadiene block copolymer may be in the range of from 15 to 50 wt.-%. In one aspect of the present invention, it is in the range of from 25 to 40 wt.-%. The amount of styrene in the styrene butadiene block copolymer may be in the range of from 50 to 85 wt.-%. In one aspect of the invention, the amount of styrene is in the range of from 60 to 75 wt.-%.

In one aspect of the invention, the styrene butadiene block copolymer has a (S/B) core with the amount of styrene in the range of from 30 to 75 wt.-% and the amount of butadiene in the range of from 25 to 70 wt.-%. In another aspect of the invention the amount of butadiene is in the range of from 35 to 70 wt.-% in the (S/B) core, and the amount of styrene is in the range of from 30 to 65 wt.-%.

The relative amount of the polystyrene blocks S compared to the total mass of the styrene butadiene block copolymer is in the range of from 5 to 40 wt.-%. In one aspect of the invention, it is in the range of from 25 to 35 wt.-% relative to the total mass of the styrene butadiene block copolymer. The relative amount of the copolymer blocks (S/B) is in the range of from 60 to 95 wt.-% relative to the total mass of the styrene butadiene block copolymer. In one aspect of the invention, the relative amount of the copolymer blocks (S/B) is in the range of from 65 to 75 wt.-%.

In a further aspect of the invention styrene butadiene block copolymers with a linear structure S—(S/B)—S are used, wherein at least one (S/B) random block with a statistical distribution of styrene to butadiene is placed in-between two styrene blocks S.

In one aspect of the invention, the styrene butadiene block copolymer shows a melt volume flow rate MVR (220/10) in the range of from 10 to 45 ml/10 min.

Styrene isoprene block copolymers (SIS) are copolymers with at least one block formed from isoprene and at least one block formed from styrene. In one aspect of the invention a triblock type styrene isoprene styrene copolymer is used. The triblock type styrene isoprene styrene block copolymer has a chemical structure represented by the formula:

wherein S is a styrene block, and E is an isoprene block.

In one aspect of the present invention, the triblock type styrene isoprene styrene block copolymer has a styrene content of 25 to 50 wt.-%. In another aspect of the invention, the styrene content is of 30 to 45 wt.-%.

Additive Component C

If present, the at least one additive C is selected from the group consisting of stabilizers, oxidation retarders, agents to counter thermal decomposition and decomposition due to ultraviolet light, lubricants and mold release agents, colorants such as dyes and pigments, fibrous and pulverulent fillers, reinforcing agents, nucleating agents, and plasticizers. The component C often is used in an amount of 0.1 to 5% by weight.

Examples of oxidation retarders and heat stabilizers are halides of the metals from group I of the periodic table, examples being sodium, potassium and/or lithium halides, optionally in combination with copper(I) halides, e.g., chlorides, bromides, iodides, sterically hindered phenols, hydroquinones, different substituted representatives of these groups, and mixtures thereof, in concentrations of up to 1 wt.-%, based on the weight of the polymer blend according to the present invention.

UV stabilizers, used generally in amounts of up to 2 wt.-%, based on the polymer blend according to the present invention, include various substituted resorcinols, salicylates, benzotriazoles, and benzophenones.

Furthermore, organic dyes may be added, such as nigrosine, pigments such as titanium dioxide, phthalocyanines, ultramarine blue, and carbon black as colorants, and also fibrous and pulverulent fillers and reinforcing agents. Examples of the latter are carbon fibers, glass fibers, amorphous silica, calcium silicate (wollastonite), aluminum silicate, magnesium carbonate, kaolin, chalk, powdered quartz, mica, and feldspar. The fraction of such fillers and colorants is generally up to 10 wt.-%, preferably up to 5 wt.-%.

Examples of nucleating agents that can be used are talc, calcium chloride, sodium phenylphosphinate, aluminum oxide, silicon dioxide, and nylon 22.

Examples of lubricants and mold release agents, which can be used in general in amounts up to 1 wt.-%, are long-chain fatty acids such as stearic acid or behenic acid, their salts (e.g., Ca or Zn stearate) or esters (e.g., stearyl stearate or pentaerythrityl tetrastearate), and also amide derivatives (e.g., ethylenebisstearylamide).

For better processing, mineral-based antiblocking agents may be added in amounts up to 0.1 wt.-% to the molding compositions of the invention. Examples include amorphous or crystalline silica, calcium carbonate, or aluminum silicate.

Processing aids which can be used are, for example, mineral oil, preferably medical white oil, in amounts up to 5 wt.-%, preferably up to 2 wt.-%.

Examples of plasticizers include dioctyl phthalate, dibenzyl phthalate, butyl benzyl phthalate, hydrocarbon oils, N-(n-butyl)benzenesulfonamide, and o- and p-tolylethylsulfonamide.

For further improving the resistance to inflammation, it is possible to add all of the flame retardants known for the thermoplastics in question, more particularly those flame retardants based on phosphorus compounds and/or on red phosphorus itself.

The sum of the components A and B and optionally C present in the inventive polymer blend makes 100 wt-%.

The polymer blends according to the present invention are characterized by reduced mold shrinkage relative to the mold shrinkage of the pure styrene copolymer A of at least 5%. In another aspect of the invention, the relative mold shrinkage reduction is at least 10%. In a further aspect of the present invention, the relative mold shrinkage reduction is at least 12%.

The relative mold shrinkage reduction of the polymer blends according to the present invention are calculated by dividing the absolute mold shrinkage of the polymer blend according to the present invention by the absolute mold shrinkage of the pure styrene copolymer A, the result being multiplied by a factor of 100.

The absolute mold shrinkage of the pure styrene copolymer A component is in the following ranges of:
from 0.3 to 0.7 for the styrene acrylonitrile copolymer (SAN),
from 0.3 to 0.7 for the styrene acrylonitrile maleic anhydride copolymer (SMA),
from 0.2 to 0.6 for the styrene acrylic copolymer,
from 0.4 to 0.7 for the acrylonitrile butadiene styrene copolymer (ABS),
from 0.7 to 0.9 for the acrylonitrile butadiene styrene terpolymers with polyamide (ABS/PA), and
from 0.5 to 0.9 for acrylonitrile styrene acrylate copolymer (ASA).

Other properties of the polymer blend according to the present invention show no or only minor deterioration.

In one aspect of the invention the Vicat softening temperature (VST B50) or the polymer blend according to the present invention is reduced by not more than 5 K compared to the VST B50 of the pure styrene copolmyer A. In another aspect of the invention, the VST B50 is reduced by no more than 2 K. In a further aspect of the invention the VST B50 is reduced by no more than 1 K.

In one aspect of the invention, the melt volume flow rate MVR (220/10) of the polymer blend according to the present invention shows a delta of less than 15 ml/10 min compared to the MVR (220/10) or the pure styrene copolymer A. In another aspect of the present invention the melt volume flow rate MVR (220/10) shows a delta of less than 10 ml/10 min. In a further aspect of the present invention the MVR (220/10) shows a delta of less than 5 ml/10 min.

In one aspect of the present invention, the E-modulus of the polymer blend according to the present invention shows a delta of less than 12% compared to the E-modulus of the pure styrene copolymer A. In another aspect of the present invention the E-modulus shows delta of less than 8%. In a further aspect of the present invention the E-modulus shows a delta of less than 4%.

In a further aspect of the invention the relative mold shrinkage of the polymer blend according to the present invention was increased by more than 5% while the MVR (220/10) showed a delta of less than 10 ml/min. In another aspect of the invention the relative mold shrinkage of the polymer blend according to the present invention was increased by more than 5% while the VST B50 was reduced by no more than 5 K. In yet another aspect of the invention the relative mold shrinkage of the polymer blend according to the present invention was increased by more than 10% while the MVR(220/10) showed a delta of less than 10 ml/min. In another aspect of the invention the relative mold shrinkage of the polymer blend according to the present invention was increased by more than 10% while the VST B50 was reduced by no more than 2 K.

The present invention further relates to a process for the preparation of blends according to the invention.

The polymer blends according to the invention can generally be obtained by any usual method, e.g. by mixing of component A, B and optionally component C.

Mixing apparatuses used are those known to the skilled person. Components A and B, and—where included—C may be mixed, for example, by joint extrusion, kneading, or rolling.

Examples of mixing apparatus for implementing the method include discontinuously operating, heated internal kneading devices with or without ram, continuously operating kneaders, such as continuous internal kneaders, screw kneaders with axially oscillating screws, Banbury kneaders, furthermore extruders, and also roll mills, mixing roll mills with heated rollers, and calenders. In one aspect of the invention, the mixing apparatus used is an extruder. Particularly suitable for melt extrusion are, for example, single-screw or twin-screw extruders. In a further aspect of the invention a twin-screw extruder is used.

In some cases the mechanical energy introduced by the mixing apparatus in the course of mixing is enough to cause the mixture to melt, meaning that the mixing apparatus does not have to be heated. Otherwise, the mixing apparatus is generally heated.

The temperature is guided by the chemical and physical properties of components A and B and—when present—C, and should be selected such as to result in a substantially liquid-melt polymer mixture. On the other hand, the temperature is not to be unnecessarily high, in order to prevent thermal damage of the polymer mixture.

The mechanical energy introduced may, however, also be high enough that the mixing apparatus may even require cooling. Mixing apparatus is operated customarily at 160 to 400° C., preferably 180 to 300° C.

In one aspect of the invention, mixing can be performed for example by joint extrusion and calendering. The calendering is expediently carried out firstly in kneaders or extruders (softening) and, if desired, on mixing rolls, followed by the actual calendering process with, if desired, addition of suitable stabilizers. Blowmolding and injection molding are carried out on the usual machinery.

In one aspect of the invention, the extrusion of the polymer blend according to the present invention is carried out in an extruder at a temperature above 100° C. In another aspect of the present invention the feeding zone of the single- or twin-screw extruder is set to a temperature in the range of 100 to 180° C., the mixing/kneading zones to 180 to 250° C. and the final zones to 220 to 270° C. Nozzle temperature is set to a temperature in the range of from 240 to 280° C.

In a further aspect, the nozzle temperature is set to a temperature in the range of from 255 to 265° C. Tool temperature is set to a temperature in the range of from 50 to 100° C. In one aspect of the invention, tool temperature is set in the range of from 60 to 80° C. Screw speed is set in the range of from 300 to 500 rpm. Injection pressure is set in the range of from 50 to 120 bar. In another aspect of the invention, injection pressure was set in the range of from 80 to 110 bar.

For workup the extruder can be equipped with a hole-plate, water-bath and pelletizer for making pellets or micro-pellets.

Another aspect of the present invention is related to the use of the polymer blend according to the present invention in an injection molding process.

Another aspect of the invention relates to polymer articles produced by injection molding of a polymer blend which blend comprises (a) 85.0 to 99.9 wt.-%, in particular 89.0 to 99.5 wt-% of at least one styrene copolymer A selected from the group consisting of styrene acrylonitrile copolymers (SAN), styrene acrylonitrile maleic anhydride terpolymers (SMA), styrene acrylic copolymers, acrylonitrile butadiene styrene terpolymers (ABS), acrylonitrile butadiene styrene terpolymers with polyamide (ABS/PA), and acrylonitrile styrene acrylate terpolymers (ASA);

(b) 0.1 to 10.0 wt.-%, in particular 0.5 to 4.5 wt-% of at least one copolymer B selected from the group consisting of styrene-butadiene block copolymers (SBC) and styrene-isoprene block copolymers (SIS);

(c) 0 to 5.0 wt.-%, in particular 0.1 to 5.0 wt.-% of at least one additive C;

wherein the wt.-% are referring to the complete polymer blend, and wherein the mold shrinkage of the polymer blend is reduced by at least 5% compared to the mold shrinkage of the pure styrene copolymer A.

In one aspect of the invention, the articles are produced by injection molding of a polymer blend comprising 89.0 to 99.5 wt.-% of at least one styrene copolymer A, and 0.5 to 4.5 wt.-% of at least one copolymer B. In another aspect of the invention articles are produced from a polymer blend comprising 89.0 to 99.0 wt.-% of at least one styrene copolymer A, and 1.0 to 4.5 wt.-% of at least one copolymer B.

In a further aspect of the present invention, the article is produced from a polymer blend comprising 91.5 to 99.4 wt.-% of at least one styrene copolymer A, 0.5 to 4.5 wt.-% of at least one copolymer B and 0.1 to 5.0 wt.-% of at least one additive C.

The article can be used in various fields of applications such as household items, electronic components, household equipment, garden equipment, medical-technology equipment, automotive parts, motor-vehicle components, and bodywork parts. In particular the polymer blend as described above can be used for the production by injection molding of a automotive part or a household part.

The following examples and claims further illustrate the invention.

Methods

The Vicat softening temperature VST was measured according to ISO 10350-1/ISO 306. To measure for example the VST B50, a needle with a circular area of 1 $mm^2$ is applied onto a test block of a thickness of 3.0 to 6.4 mm with a force of 50 N, while the block is heated with a temperature gradient of 50 K/h. The Vicat softening temperature is reached when the needle penetrates the test block to a depth of 1 mm.

The melt volume flow rate (MVR) was measured according to ISO 1133. To measure for example the MVR 220/10, the measurement is carried out at 220° C. with a mass of 10 kg.

Density was measured according to polymer norm ISO 1183 (of 2013).

E-modulus and tensile strength were measured according to ISO 527 (of 2012).

Determination of absolute and relative mold shrinkage:

In order to measure the absolute mold shrinkage, the length of the mold and the length of the injection molded color plaque (the part) have been measured. The absolute shrinkage is calculated as follows:

$$\text{absolute shrinkage}[\%]=100*(\text{length of the mold}-\text{length of the part})/(\text{length of the mold})$$

The absolute shrinkage of the pure styrene copolymer A (e.g. VT2410) without addition polymer-norm of copolymer B is used as baseline sample.

The relative shrinkage is calculated by dividing the absolute shrinkage of the example with copolymer B by the absolute shrinkage of the baseline sample as follows:

$$\text{relative shrinkage}[\%]=100*(\text{absolute shrinkage(example)})/(\text{absolute shrinkage(baseline sample)})$$

Components Used for the Compositions:

Compatibilizer VT2410: Styrene acrylonitrile maleic anhydride copolymer (24 wt.-% acrylonitrile, 75.0 wt.-% styrene, 1.0 wt.-% maleic anhydride); INEOS Styrolution (Frankfurt); MVR 22 ml/10 min (220° C./10 kg) ISO 1133, VST/B/50 (50° C./h, 50 N, ISO 306) 106° C., Density 1.08 g/ml (ISO 1183).

Styroflex 2G66: Styrene butadiene block copolymer (SBC); INEOS Styrolution, MVR 13 ml/10 min (200° C./5 kg), VST B/1 (120° C./h, 10 N) 35° C.

Vector 4411A: Linear styrene isoprene styrene (SIS) block copolymer (44% S); TSRC-Dexco; MVR 40 g/10 min (200° C./5 kg), tensile strength 25 MPa.

Preparation of the Copolymer Blends:

All samples have been compounded using a Coperion ZSK25 twin-screw extruder; mass temperature $T_m$ 230° C., screw speed: 400 rpm. Color plaques for shrinkage measurement have been produced via injection molding:

TABLE 1

Injection molding conditions used for color plaque preparation

|  | Comp. Ex. 1 | Ex. 1 | Ex. 2 | Ex. 3 |
|---|---|---|---|---|
| injection pressure [bar] | 100 | 80 | 110 | 100 |
| nozzle temp. [° C.] | 265 | 255 | 265 | 265 |
| tool temp. [° C.] | 70 | 70 | 70 | 70 |
| clamping force [kN] | 500 | 500 | 500 | 500 |

TABLE 2

Injection molding conditions of tensile specimens and Izod specimens (used for VST B50)

|  | Comp. Ex. 1 | Ex. 1 | Ex. 2 | Ex. 3 |
|---|---|---|---|---|
| injection pressure [bar] | 100 | 100 | 100 | 100 |
| nozzle temp. [° C.] | 265 | 265 | 265 | 265 |
| tool temp. [° C.] | 70 | 70 | 70 | 70 |
| clamping force [kN] | 500 | 500 | 500 | 500 |

TABLE 3

Mold Shrinkage and other properties; base resin: VT2410

| No. | Copolymer B | Copolymer B wt.-% | mold shrinkage relative to comparative sample [%] | MVR (220/10) [ml/10 min], ISO 1133 | VST B50 [° C.], DIN EN ISO 306 | E modulus [MPa], ISO 527 |
|---|---|---|---|---|---|---|
| Comp. Ex. 1 | — | — | 100 | 54.7 | 107 | 3698 |
| Ex. 1 | SBC (Styroflex 2G66) | 2 | 88 | 59.6 | 107.5 | 3764 |
| Ex. 2 | SBC (Styroflex 2G66) | 5 | 88 | 63.4 | 105 | 3487 |
| Ex. 3 | Vector 4411A | 2 | 88 | 56.1 | 107.7 | 4108 |

Addition of 2 and 5 wt.-% SBC (or SIS) block copolymers reduced the mold shrinkage of styrene copolymer, such as styrene acrylonitrile maleic anhydride copolymer VT2410 by 12%. The other important properties MVR, VST B50 and E-modulus were not significantly affected.

The invention claimed is:

1. A polymer blend with at least two different copolymer components, comprising:
    (a) 89.0 to 99.5 wt.-% of at least one styrene copolymer A selected from the group consisting of styrene acrylonitrile maleic anhydride terpolymers (SMA) with the relative composition of 20 to 30 wt.-% acrylonitrile, 0.5 to 3 wt.-% maleic anhydride, and 67 to 79.5 wt.-% styrene;
    (b) 0.5 to 4.5 wt.-% of at least one copolymer B selected from the group consisting of styrene-butadiene block copolymers (SBC) and styrene-isoprene block copolymers (SIS); and
    (c) 0 to 5.0 wt.-% of at least one additive C;
    wherein the wt.-% refers to the complete polymer blend, and wherein the mold shrinkage of the polymer blend is reduced by at least 5% compared to the mold shrinkage of the pure styrene copolymer A.

2. The polymer blend according to claim 1, wherein the mold shrinkage of the styrene copolymer A is in the range from 0.3 to 0.7 for the styrene acrylonitrile maleic anhydride copolymer (SMA).

3. The polymer blend according to claim 1, comprising:
    (i) 89.0 to 99.0 wt.-% of at least one styrene copolymer A, and
    (ii) 1.0 to 4.5 wt.-% of at least one copolymer B.

4. The polymer blend according to claim 1, wherein the copolymer B is a styrene-butadiene block copolymer (SBC).

5. The polymer blend according to claim 1, wherein the copolymer B is a styrene-isoprene block copolymer (SIS).

6. The polymer blend according to claim 1, wherein the mold shrinkage of the polymer blend is reduced by at least 10% as compared to the mold shrinkage of the styrene copolymer A component.

7. A process for the preparation of the polymer blend according to claim 1, comprising the steps of mixing component A, B, and optionally C.

8. The process according to claim 7, wherein a mixture of components A and B, and optionally component C are extruded in an extruder at a temperature above 100° C. to give the polymer blend.

9. A method of use of a polymer blend according to claim 1 in an injection molding process.

10. A polymer article produced by injection molding of a polymer blend, which blend comprises:
(a) 89.0 to 99.5 wt.-% of at least one styrene copolymer A selected from the group consisting of styrene acrylonitrile maleic anhydride terpolymers (SMA) with the relative composition of 20 to 30 wt.-% acrylonitrile, 0.5 to 3 wt.-% maleic anhydride, and 67 to 79.5 wt.-% styrene
(b) 0.5 to 4.5 wt.-% of at least one copolymer B selected from the group consisting of styrene-butadiene block copolymers (SBC) and styrene-isoprene block copolymers (SIS); and
(c) 0 to 5.0 wt.-% of at least one additive C;
wherein the wt.-% refers to the complete polymer blend, and wherein the mold shrinkage of the polymer blend is reduced by at least 5% compared to the
mold shrinkage of the pure styrene copolymer A.

11. The article according to claim 10, wherein the blend comprises:
(a) 91.5 to 99.4 wt.-% of at least one styrene copolymer A,
(b) 0.5 to 4.5 wt.-% of at least one copolymer B, and
(c) 0.1 to 5.0 wt.-% of at least one additive C.

12. The article according to claim 10, wherein the article is an automotive part or a household part.

13. A polymer blend according to claim 1, wherein
the Vicat softening temperature (VST B50) or the polymer blend is reduced by not more than 5 K compared to the VST B50 of the pure styrene copolymer A,
the melt volume flow rate MVR (220/10) of the polymer blend shows a delta of less than 15 ml/10 min compared to the MVR (220/10) of the pure styrene copolymer A, and
the E-modulus of the polymer blend shows a delta of less than 12% compared to the E-modulus of the pure styrene copolymer A.

14. A polymer article according to claim 10, wherein
the Vicat softening temperature (VST B50) or the polymer blend is reduced by not more than 5 K compared to the VST B50 of the pure styrene copolymer A,
the melt volume flow rate MVR (220/10) of the polymer blend shows a delta of less than 15 ml/10 min compared to the MVR (220/10) of the pure styrene copolymer A, and
the E-modulus of the polymer blend shows a delta of less than 12% compared to the E-modulus of the pure styrene copolymer A.

* * * * *